(12) United States Patent
Warren et al.

(10) Patent No.: US 7,297,308 B2
(45) Date of Patent: Nov. 20, 2007

(54) MOLDED, PLASTIC CONTAINER AND A METHOD FOR MAKING THE SAME

(75) Inventors: Donald F. Warren, West Chicago, IL (US); Brent Lindberg, St. Charles, IL (US)

(73) Assignee: Liquid Container L.P., West Chicago, IL (US)

( * ) Notice: Subject to any disclaimer, the term of this patent is extended or adjusted under 35 U.S.C. 154(b) by 118 days.

(21) Appl. No.: 10/953,429

(22) Filed: Sep. 29, 2004

(65) Prior Publication Data

US 2006/0065619 A1    Mar. 30, 2006

(51) Int. Cl.
B29C 49/54    (2006.01)
B29C 49/72    (2006.01)

(52) U.S. Cl. ..................... 264/536; 264/161
(58) Field of Classification Search ................ 264/536, 264/161
See application file for complete search history.

(56) References Cited

U.S. PATENT DOCUMENTS

| | | | |
|---|---|---|---|
| 3,120,679 A | 2/1964 | Price et al. | |
| 3,285,454 A | 11/1966 | Bailey | |
| 3,369,690 A | 2/1968 | Thomas | |
| 3,417,892 A | 12/1968 | Schweiger | |
| 3,481,501 A | 12/1969 | Anderson | |
| 3,499,071 A * | 3/1970 | Hurst | 264/536 |
| 3,534,435 A | 10/1970 | John | |
| 3,564,087 A | 2/1971 | Ruekberg | |
| 3,679,785 A | 7/1972 | Dike | |
| 3,793,422 A | 2/1974 | Johnston | |
| 3,795,162 A | 3/1974 | Jaeger | |
| 3,892,828 A * | 7/1975 | Weatherly et al. | 264/515 |
| 3,942,932 A | 3/1976 | Gilbert | |
| 4,266,927 A | 5/1981 | Gilbert et al. | |
| 4,497,855 A | 2/1985 | Agrawal et al. | |
| 4,518,558 A | 5/1985 | Anway et al. | |
| 4,579,260 A | 4/1986 | Young et al. | |
| 4,846,359 A | 7/1989 | Baird et al. | |
| 5,005,716 A | 4/1991 | Eberle | |
| 5,191,988 A | 3/1993 | Reil et al. | |
| 5,232,107 A | 8/1993 | Krall et al. | |
| 5,275,780 A * | 1/1994 | Robinson | 264/529 |
| 5,392,950 A | 2/1995 | Foss et al. | |
| 5,477,974 A | 12/1995 | Reil et al. | |
| D397,291 S | 8/1998 | Tabaroni et al. | |
| 6,773,716 B2 | 8/2004 | Ream et al. | |
| 2003/0039780 A1 | 2/2003 | Finetti | |

* cited by examiner

Primary Examiner—Suzanne E. McDowell
(74) Attorney, Agent, or Firm—Gary R. Jarosik

(57) ABSTRACT

A plastic container having a body portion and a handle portion which extends from the body portion is formed using a pair of mold halves placed into engagement. During the molding process, a surface of the handle portion is provided with a recess in at least one area where the mold halves are in placed into engagement.

9 Claims, 2 Drawing Sheets

MOLDED, PLASTIC CONTAINER AND A METHOD FOR MAKING THE SAME

FIELD

The following is generally directed to a molded, plastic container and a method for making the same.

BACKGROUND

As described in U.S. Pat. No. 3,795,162, in well-known blow molding processes, bottles or other containers or articles are formed from an extruded parrison between a pair of mating mold halves, whereupon the mold halves separate and the molded article is ejected. In most operations of this nature, flashings or fins of excess plastic material are formed at the parting line where the mold halves are in engagement. The flashing is then removed in a separate operation, either by hand or by machine.

Further illustrated and described in U.S. Pat. No. 6,773,716 is a process for molding a container having a handle. In the described process, which is merely exemplary of many other types of methods for making containers having handles, the mold halves are again separated to free the container. When the container is removed from the mold, a compressed and bonded area of material, defined by the mold halves, is located between the container body and the handle. The material comprising the compressed and bonded area is then trimmed to form a handle opening. Removal of the material is accomplished through means known in the art such as laser, water jets, or mechanical impact de-flashing. By design, when the flashing is trimmed from the handle opening, a rib is left behind along the inside of the handle as formed by the bonding of adjacent areas of the wall.

When excess flashing is present in the handle grip area, whether by design or merely as a result of the trimming process, the flashing that remains may undesirably intrude into the hand of an individual lifting or holding the container by the handle. Accordingly, a need exists for an improved, molded, plastic container that can be lifted and/or held without an individual experiencing any serious discomfort caused by flashing that may remain on the handle grip area.

SUMMARY

In accordance with this need, the following discloses a plastic container and method for making the same wherein the plastic container is designed to locate any residual post trimming flashing in the grip area of a container in a manner such that direct contact between a hand of an individual and the residual flashing is noticeably reduced or eliminated. To reduce the amount of flashing an individual may encounter when lifting or holding the plastic container, the mold halves used in the bottle formation process provide the plastic container with a recess in the area of the parting line where the mold halves are in engagement. By way of example, the forming of such a recess is particularly desirable in the area of the handle interior surface. When the plastic container is then removed from the mold and the flashing trimmed, any residual flashing that may result from the trimming process or left by design will be located generally within a formed recess. The formed recess thus functions to generally hide any flashing since any flashing which is located within a formed recess generally fails to extend beyond the exterior surface of the plastic container where any such flashing would undesirably intrude into the hand of an individual lifting and/or holding the container.

A better understanding of the objects, advantages, features, properties and relationships of the invention will be obtained from the following detailed description and accompanying drawings which set forth illustrative embodiments that are indicative of the various ways in which the principles of the invention may be employed.

BRIEF DESCRIPTION OF THE DRAWINGS

For a better understanding of the invention, reference may be had to preferred embodiments shown in the following drawings in which.

DETAILED DESCRIPTION

With reference to the figures, a molded product and method for making the same is described. In this regard, it is to be appreciated that the molded product may be formed using a blow molding process, which is well known to those of ordinary skill in the art. By way of example, a stretch blow molding process is illustrated and described in the aforementioned U.S. Pat. No. 6,733,716 which is hereby incorporated by reference in its entirety. It will also be appreciated that the blow molding process may be an extrusion blow molding process. In these exemplary types of blow molding processes, a pair of opposed mold sections are utilized which are closed in mating position. Once the product is formed within the mated molds, the opposed mold sections are opened to eject the molded product. As will be appreciated, the molded product issuing from the mold will typically carry flashings which are located in the area where the mold sections meet.

Figure 1:
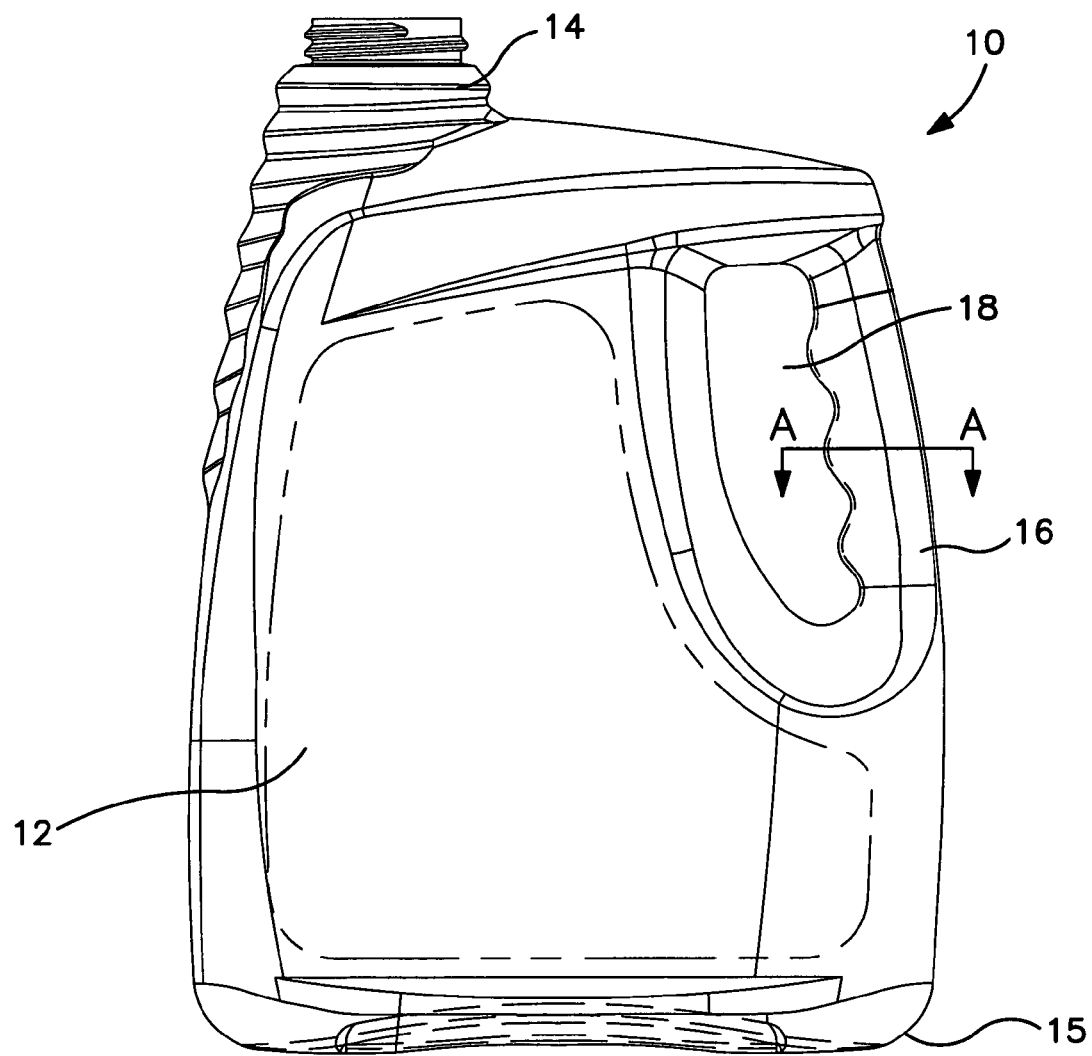
FIG. 1 illustrates a side elevation view of an exemplary plastic bottle.

In the example described herein, the resulting product is a plastic container 10. The plastic container 10 includes a body portion 12 (for holding a quantity of material), a neck portion 14 (which may the threaded for engaging a cap) having an opening leading to the body portion 12 (for inserting and removing the product contents into and from the plastic container), and a handle portion 16 attached to the body portion 12 (for lifting and/or holding the body portion 12). When issued from the mold, the plastic container 10 will typically include a compressed and bonded area of material which can be located in one or several areas of the container depending upon the specific blow molding process that is employed. In the example of FIG. 1, the bonded material would be present in an area which, when removed via a trimming process, results in an opening 18. The opening 18 allows for an individual to lift and/or hold the plastic container 10 by the handle portion 16. Removal of the compressed and bonded area of material may be accomplished through means well known in the art, such as through various press or cutting methods, mechanical impact de-flashing, or the like.

Figure 2:
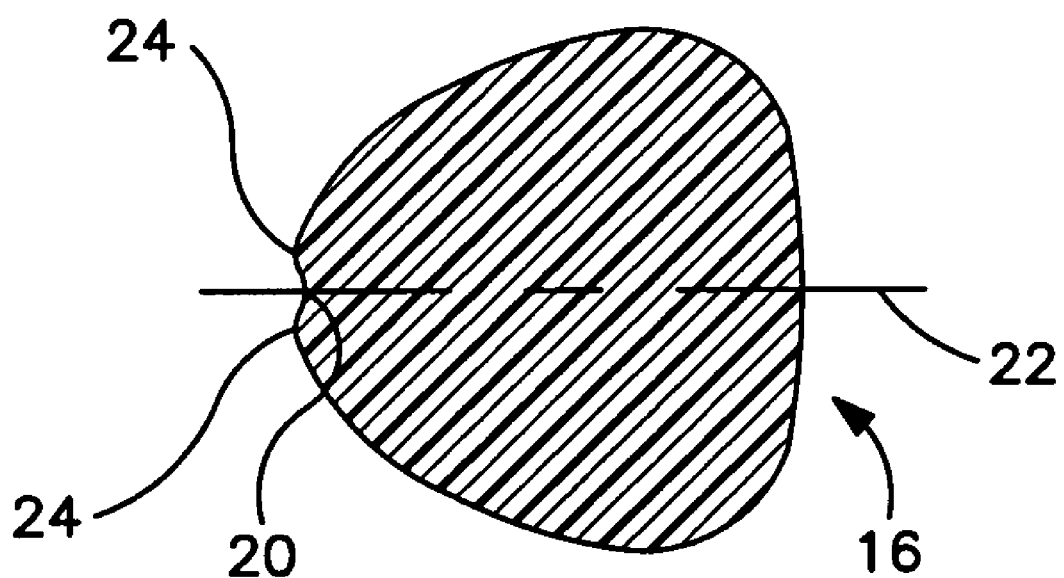
FIG. 2 illustrates a cross-sectional view along line A-A of FIG. 1.

To generally limit the visual appearance and potential for contact with any flashing that may be present after the trimming process has been performed, for example, to remove the material from the opening 18, the mold halves used in the molding process are adapted to provide the plastic container 10 with a recess 20 in the area of the parting line 22 where the mold halves are in engagement. As illustrated in FIG. 2, the forming of such a recess 20 is particularly desirable in the area of the interior surface of the handle 16, i.e., the surface of the handle 16 which faces the body 12 of the plastic container 10. Preferably, the recess 20 extends along a substantial entirety of the length of the surface handle 16 which faces the body 12, which surface may be further provided with undulations which function to form finger grips. While illustrated as being incorporated in the handle 16, it will be appreciated that such a recess 20 may be formed anywhere along the parting line 22 of the mold halves which is deemed desirable. Furthermore, while the recess 20 is illustrated as having a generally concave shape thereby forming an arcuate surface which extends inwardly into the handle 16, it will be appreciated that the recess 20 may be provided with other geometrical shapes without departing from the spirit of the invention. It will be additionally understood that the mold halves include elements that are complimentary to the shape provided to the recess 20 which element function to form the recess 20 in the molded, plastic container 10.

For use in generally assuring that any flashing that may result from the trimming process will then be located generally within the entirety of a formed recess 20, it is preferred that the depth of the recess 20 is either greater than or approximately equal to the length of any residual flashing. The depth of the recess 20 can also be less than the length of any residual flashing. In such a construction, the depth of the recess 20 will be such that the protrusion of any residual flashing above a plane defined by the outermost or highest surfaces where the recess begins is significantly less that the height of the flashing itself.

By way of further example, in the illustrated embodiment, the recess 20 is provided with a depth of approximately 0.02 inches, allowing for conventional errors in measurement. In this manner, any flashing that remains after a trimming process, which is typically less that 0.02 inches in height, will not extend beyond the outermost surface of the handle 16 (generally indicated as 24) where any such flashing would undesirably intrude into the hand of an individual lifting and/or holding the container. Furthermore, the recess illustrated in FIG. 2, having an inwardly projecting arcuate surface, is provided with a blend radius of approximately 0.05 inches, again allowing for conventional errors in measurement. In this manner, the recess 20 is provided with a width of approximately 0.12 inches which is seen to be small enough to prevent flesh from a hand of an individual lifting or holding the container from entering into the recess 20 to a depth where the flesh would contact any remaining flashing in a manner that may be deemed to feel objectionable. Thus, as will be appreciated, by providing a recess 20 to the molded plastic container 10 in selected areas where the parting line 22 of the mold halves are in engagement, a molded plastic container 10 is produced which effectively reduces the amount of flashing that is exposed to an individual handling the molded plastic container 10. Further, the provision of a recess 20 avoids the need for performing any further trimming operation on the flashing for the purpose of attempting to provide a flashing region of the handle area of the container 10 with a more uniform and less pronounced surface.

It will also be appreciated by those skill in the art that this approach can be employed in other regions of the molded plastic container 10 besides the handle area 16 where direct contact with or the visual appearance of residual flashing would be considered objectionable. Generally this approach of incorporating a small recess 20 directly on the parting line area would be most beneficial in the regions of the plastic container 10 above the base 15 of the plastic container 10. This could include adapting recesses to address residual flashing along the sides, top, and inside and outside surfaces of the handle area.

While specific embodiments of the invention have been described in detail, it will be appreciated by those skilled in the art that various modifications and alternatives to those details could be developed in light of the overall teachings of the disclosure. For example, while described in connection with a blow molding process, it will be understood that the principles of the invention may be utilized in connection with any process utilizing a mold during the formation of a plastic container. Accordingly, the particular arrangement disclosed is meant to be illustrative only and not limiting as to the scope of the invention which is to be given the full breadth of the appended claims and any equivalents thereof.

What is claimed is:

1. A method for making a plastic container including a body portion having a base, comprising:
    forming during a molding process, through use of a pair of mold halves that are placed into engagement, a recess that is located in an area above the base of the body portion and that extends inwardly towards the body portion where the pair of mold halves are placed into engagement; and
    trimming a bonded material formed in the recess during the molding process whereupon a flashing is left within the recess;
    wherein the recess is formed with a depth that extends inwardly towards the body portion and the bonded material is trimmed such that a length of any portion of the flashing that extends above a plane defined by outermost surfaces of the body portion adjacent to the recess is less than the depth of the recess.

2. The method as recited in claim 1, wherein no portion of the flashing extends above the plane defined by outermost surfaces of the body portion adjacent to the recess.

3. The method as recited in claim 1, wherein the body portion has a handle portion and wherein the recess is formed in the handle portion.

4. The method as recited in claim 3, wherein the recess is formed in the surface of the handle portion which faces the body portion.

5. The method as recited in claim 4, wherein the recess has an arcuate surface which extends into the handle portion.

6. The method as recited in claim 5, wherein the recess achieves a depth into the handle portion of approximately 0.020 inches.

7. The method as recited in claim 6, wherein the recess is provided with a width of approximately 0.12 inches.

8. The method as recited in claim 7, wherein the recess has an arcuate surface which extends into the handle portion.

9. The method as recited in claim 8, wherein the recess extends along a length of a surface of the handle portion which faces the body portion.

* * * * *